(12) United States Patent
Ogrizovic

(10) Patent No.: US 12,404,920 B2
(45) Date of Patent: Sep. 2, 2025

(54) DRIVE DEVICE FOR A CAR, IN PARTICULAR FOR A PASSENGER CAR

(71) Applicant: Mercedes-Benz Group AG, Stuttgart (DE)

(72) Inventor: Goran Ogrizovic, Nuertingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 0 days.

(21) Appl. No.: 18/722,191

(22) PCT Filed: Dec. 19, 2022

(86) PCT No.: PCT/EP2022/086745
§ 371 (c)(1),
(2) Date: Jun. 20, 2024

(87) PCT Pub. No.: WO2023/126237
PCT Pub. Date: Jul. 6, 2023

(65) Prior Publication Data
US 2025/0052306 A1   Feb. 13, 2025

(30) Foreign Application Priority Data

Jan. 3, 2022   (DE) .................. 10 2022 000 018.0

(51) Int. Cl.
*F16H 37/08*   (2006.01)
*B60K 1/02*   (2006.01)
(Continued)

(52) U.S. Cl.
CPC ........... *F16H 37/0806* (2013.01); *B60K 1/02* (2013.01); *B60K 17/165* (2013.01); *B60K 17/26* (2013.01)

(58) Field of Classification Search
CPC . F16H 37/0806; B60K 1/02; B60K 2001/001; B60K 17/165; B62D 11/14
(Continued)

(56) References Cited

U.S. PATENT DOCUMENTS 8,813,879 B2 *   8/2014   Walter ............... H02P 25/22
                                              180/69.6
8,992,367 B2 *   3/2015   Kalmbach .......... H02K 7/006
                                              475/150
(Continued)

FOREIGN PATENT DOCUMENTS

CN            113085518 A       7/2021
DE     10 2015 000 466 B4       8/2016
(Continued)

OTHER PUBLICATIONS

International Search Report (PCT/ISA/210) issued in PCT Application No. PCT/EP2022/086745 dated May 10, 2023 (2 pages).

*Primary Examiner* — Derek D Knight
(74) *Attorney, Agent, or Firm* — Crowell & Moring LLP

(57) ABSTRACT

A drive device for a car includes a first output shaft via which a first vehicle wheel of the car is drivable, a second output shaft arranged coaxially to the first output shaft via which a second vehicle wheel of the car is drivable, a differential transmission via which the output shafts are drivable, and three axial flux machines arranged coaxially to one another and coaxially to the output shafts. The three axial flux machines are a first axial flux machine via which the first output shaft is drivable by bypassing the differential transmission, a second axial flux machine via which the second output shaft is drivable by bypassing the differential transmission, and a third axial flux machine between the first axial flux machine and the second axial flux machine in the (Continued)

axial direction of the axial flux machines via which the output shafts are drivable via the differential transmission.

4 Claims, 2 Drawing Sheets

(51) Int. Cl.
*B60K 17/16* (2006.01)
*B60K 17/26* (2006.01)

(58) Field of Classification Search
USPC .......................................................... 475/18
See application file for complete search history.

(56) References Cited

U.S. PATENT DOCUMENTS

| | | | |
|---|---|---|---|
| 9,067,484 B2 * | 6/2015 | Zhao | ........................ B60K 1/00 |
| 9,255,633 B2 * | 2/2016 | Märkl | .................. B60K 17/165 |
| 10,703,200 B2 | 7/2020 | Stoermer | |
| 11,005,337 B2 * | 5/2021 | Hung | ................... B60K 17/165 |
| 2015/0107914 A1 | 4/2015 | Zhao | |

FOREIGN PATENT DOCUMENTS

| | | |
|---|---|---|
| DE | 10 2019 115 918 A1 | 12/2020 |
| DE | 102020209431 A1 * | 1/2022 |
| WO | WO 2018/150010 A1 | 8/2018 |

\* cited by examiner

DRIVE DEVICE FOR A CAR, IN PARTICULAR FOR A PASSENGER CAR

BACKGROUND AND SUMMARY OF THE INVENTION

The invention relates to a drive device for a car, in particular for a passenger car.

A drive device for a motor vehicle is known from DE 10 2015 000 466 B4. Moreover, WO 2018/150010 A1 discloses an axis drive unit for a motor vehicle that can be driven electrically.

The object of the present invention is to create a drive deice for a car, such that a particularly advantageous drive of the car can be achieved.

The invention relates to a drive device, also referred to as an axis drive, for a car, in particular for a passenger car. This means that, in its completely produced state, the car has the drive device and can be driven by means of the drive device, in particular purely electrically. In particular, the car has at least one vehicle axis, also simply referred to as an axis, which has at least or exactly two vehicle wheels, also referred to simply as wheels. As is explained below in more detail, the vehicle wheels can be driven by means of the drive device, in particular purely electrically, whereby the car can be driven, in particular purely electrically. In particular, the vehicle wheels are arranged on sides of the car, also referred to as a vehicle, that lie opposite each other in the transverse direction of the vehicle.

The drive device has a first output shaft, by which or via which a first of the vehicle wheels of the vehicle axis can be driven. To do so, for example, the first vehicle wheel is coupled or can be coupled to the first output shaft in a manner that transfers torsional moments. The drive device has a second output shaft arranged coaxially to the first output shaft, by which or via which the second vehicle wheel of the vehicle axis of the car can be driven. To do so, for example, the second vehicle wheel is coupled or can be coupled to the second output shaft in a manner that transfers torsional moments. Moreover, the drive device comprises a differential transmission, via which the output shafts can be driven. In other words, the output shafts can be driven by the differential transmission. The differential transmission is formed, for example, as a cone differential, which is also referred to as a cone wheel differential. Of course it is conceivable that the differential transmission is formed as a different kind of differential transmission. As is already well known from the general prior art, the differential transmission is formed, in particular, to allow different rotational speeds of the output shafts and thus of the vehicle wheels when cornering the car, for example, in particular in such a way that the curve outer vehicle wheel rotates or can rotate with a higher rotational speed than the curve inner vehicle wheel, in particular while the vehicle wheels can be driven or are driven by means of the drive device. Moreover, the drive device has three axial flux machines arranged coaxially to one another and coaxially to the output shafts, namely a first axial flux machine, a second axial flux machine and a third axial flux machine. The respective axial flux machine has a respective stator and, in each case, at least or exactly two rotors, which can be driven by means of the respective stator and thus can be rotated around a respective engine axis of rotation in relation to the respective stator. Here, the respective rotor of the respective axial flux machine is arranged between the respective rotors of the respective axial flux machine in the axial direction of the respective axial flux machine, wherein the respective axial direction of the respective axial flux machine coincides with the respective engine axis of rotation. In particular, the axial flux machines are arranged following on from one another and thus one behind the other in the axial direction of the respective axial flux machine, in particular completely. The rotors of the first axial flux machine are connected to one another in a rotationally fixed manner and thus form a first complete rotor. The rotors of the second axial flux machine are connected to one another in a rotationally fixed manner and thus form a second complete rotor. The rotors of the third axial flux machine are connected to one another in a rotationally fixed manner and thus form a third complete rotor.

By bypassing the differential transmission, the first output shaft can be driven by means of the first axial flux machine, in particular by means of the complete rotor of the first axial flux machine. This means that, based on a first torsional moment flow, via which a respective first torsional moment can be transferred from the complete rotor of the first axial flux machine to the first output shaft, in order to thus drive the first output shaft, the differential transmission is not arranged in the first torsional moment flow or at least not in the first torsional moment flow between the complete rotor of the first axial flow machine and the first output shaft, such that the respective first torsional moment does not flow via the differential transmission on its way from the complete rotor of the first axial flux machine to the or onto the first output shaft along the torsional moment flow, and thus bypasses the differential transmission. By bypassing the differential transmission, the second output shaft can be driven by means of the second axial flux machine, in particular by means of the complete rotor of the second axial flux machine. This means that, based on a second torsional moment flow, via which a respective second torsional moment can be transferred from the complete rotor of the second axial flux machine to the or onto the second output shaft, the differential transmission is not arranged in the second torsional moment flow or, in any case, not in the second torsional moment flow between the complete rotor of the second axial flux machine and the second output shaft. Thus, the respective second drive torsional moment on its way from the complete rotor of the second axial flux machine to the or onto the second output shaft along the torsional moment flow, not flowing via the differential transmission, and thus bypasses the differential transmission. Expressed in other words again, the first or second axial flux machine can provide the respective first or second torsional moment via its complete rotor, in order to thus drive the first or second output shaft. The respective first or second torsional moment is here transferred via the first or second torsional moment flow from the complete rotor of the first or second axial flux machine onto the or to the first or second output shaft, wherein when it flows along the first or second torsional moment flow from the complete rotor of the first or second axial flux machine to the or onto the first or second output shaft and thus has reached the first or second output shaft, the respective first or second torsional moment is not flowed via the differential transmission from the complete rotor of the first or second axial flux machine onto the or to the first or second output shaft.

The output shafts can be driven via the differential transmission by means of the third axial flux machine, in particular by means of the complete rotor of the third axial flux machine. This means that the third axial flux machine can provide a respective third torsional moment via its complete rotor for driving the respective output shaft. Based on a third torsional moment flow via which the respective third torsional moment can be transferred from the complete rotor of the third axial flux machine to the respective output shaft, the differential transmission is arranged in the third torsional moment flow and here upstream of the respective output shaft and downstream of the complete rotor of the third axial flux machine, such that the respective third torsional moment on its way from the complete rotor of the third axial flux machine to the or onto the respective output shaft via the differential transmission flows from the complete rotor of the third axial flux machine onto the or to the respective output shaft. To do so, it is provided, for example, that the complete rotor of the third axial flux machine is connected to an input element of the differential transmission, in particular in a rotationally fixed manner, wherein the input element of the differential transmission, for example, which is also simply referred to as a differential, is a differential cage.

In an advantageous design of the invention, a first freewheel is provided, via which the first output shaft of the first axial flux machine can be driven by bypassing the differential transmission. A second freewheel is also provided, via which the second output shaft of the second axial flux machine can be driven by bypassing the differential transmission.

In an advantageous design of the invention, a first frictionally engaged or positive-locking switching element is provided, by means of which the first output shaft of the first axial flux machine can be driven by bypassing the differential transmission. A second frictionally engaged or positive-locking switching element is also provided, by means of which the second output shaft of the second axial flux machine can be driven by bypassing the differential transmission.

In particular, the invention is based on the following knowledge and considerations: the drive device according to the invention is based on a so-called dual motor drive unit, since a respective electric engine is presently provided in the form of the first electric engine or the second electric engine per output shaft and thus per output shaft side. In doing so, a particularly advantageous driving dynamic can be achieved, since a torsional moment distribution, also referred to as torque vectoring, in particular, and other driving dynamic interventions can be achieved. Based on this dual motor drive unit, the dual motor drive unit is augmented by a third electric engine, wherein all electric engines are formed as axial flux machines, whereby in particular a particularly advantageous support operation, also referred to as boost operation or boost mode, can be achieved, wherein by forming the electric engines as axial flux machines, the necessary axial construction space can be kept low. Vehicles that are designed with a dual motor drive unit are generally vehicles with a high performance. This high performance is provided by high-performance electric engines, which, however, cannot usually be optimally designed for a normal driving cycle, in which high performance is not required. Smaller electric engines are generally more efficient in conventional everyday driving cycles. Here, the goal is to depict the functionality of a dual motor drive unit in the vehicle, however as far as possible without efficiency disadvantages. In particular with an axial flux machine, the radial scaling for performance torsional moment increase has a negative impact on the permissible maximum rotational speed. Since the radial construction space for electric engines is generally limited and thus also the performance or the torsional moment per electric engine, the third electric engine allows an advantageous performance scaling. Depending on the radial dimensioning of the respective complete rotor of the respective axial flux machine, the rotational speed limits can emerge. Smaller rotor dimensions allow higher rotational speeds. As a result of corresponding motor dimensioning, the two electric engines bound to the output shafts can rotate more quickly than the third axial flux machine used as a boost electric engine, and thus a higher maximum speed of the car can be achieved. The third axial flux machine also referred to as a power electric engine could thus be decoupled above a certain speed. In other words, based on a dual motor drive unit, the third axial flux machine is used as a boost or power electric motor or electric engine, which is bound to the differential transmission, from which the output shafts lead out, in particular as differential shafts, on which the first axial flux machine and the second axial flux machine can have an impact. In particular, it is conceivable that the first or second axial flux machine can be switched via a respective transfer element, such as a freewheel or via an actuated or actuatable switching element, such has a frictional coupling, for example, or a claw coupling or can act on the respective output shaft, in particular by bypassing the differential transmission.

The invention enables a particularly efficient operation with a particularly high performance density, since the three axial flux machines can be arranged coaxially. In particular, an advantageous scalability can thus be depicted. Rotors of axial flux machines with smaller diameters can be used, which enables a higher maximum rotational speed, with which single-start transmissions with high highest speed can be depicted better.

Further advantages, features and details of the invention emerge from the below description of preferred exemplary embodiments and by means of the drawings. The features and feature combinations mentioned above in the description and the features and feature combinations mentioned below in the description of the figures and/or shown only in the figures can be used not only in the respectively specified combination, but also in other combinations or on their own, without leaving the scope of the invention.

DETAILED DESCRIPTION OF THE DRAWINGS

Figure 1:
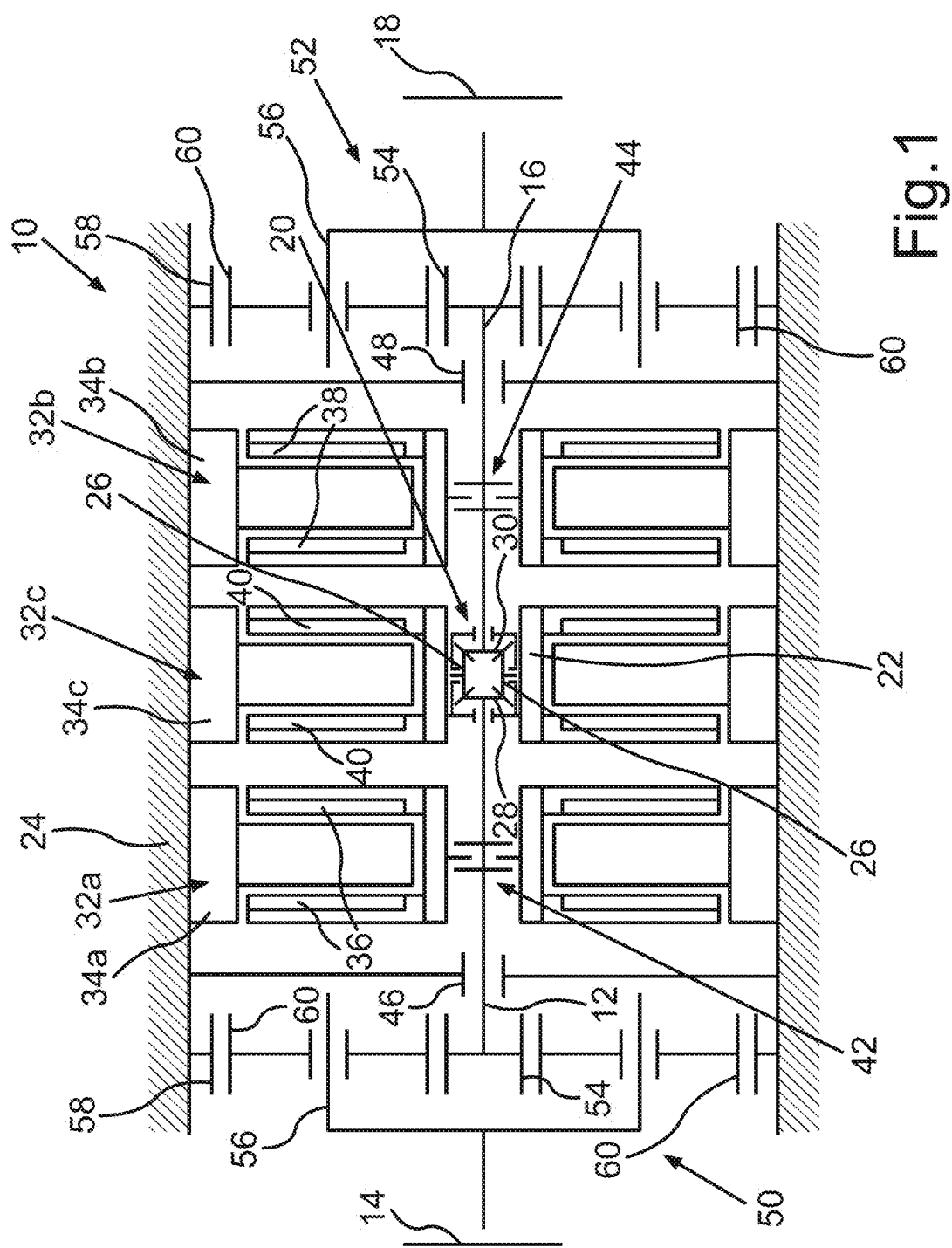
FIG. 1 a schematic depiction of a first embodiment of a drive device for a car, in particular for a passenger car.

In a schematic depiction, FIG. 1 shows a first embodiment of a drive device 10 for a car, in particular for a passenger car. The car is also referred to as a motor vehicle or vehicle and has, for example, at least or exactly two vehicle axes arranged one after the other in the longitudinal direction of the vehicle and also simply referred to as axes. The respective vehicle axis has at least or exactly two vehicle wheels, wherein the respective vehicle wheels of the respective vehicle axis are arranged on sides of the motor vehicle lying opposite one another in the transverse direction of the vehicle. As is explained in yet more detail below, the vehicle wheels of one of the vehicle axes can be driven purely electrically, in particular, by means of the drive device 10. When we speak below of vehicle wheels, unless otherwise specified, this is to be understood to mean the vehicle wheels of the one vehicle axis that can be driven by means of the drive device 10. The drive device 10 has a first output shaft 12, via which a first of the vehicle wheels, labelled with 14 in FIG. 1, can be driven. Furthermore, the drive device 10 has a second output shaft 16, via which the second vehicle wheel, labelled with 18 in FIG. 1, can be driven. Furthermore, the drive device 10 has a differential transmission 20, which is formed as a cone wheel differential in the first embodiment and, here, has a differential cage 22 as the input element. The output shafts 12 and 16 are arranged coaxially to each other and can be rotated around a common output shaft axis of rotation in relation to a housing 24 of the drive device 10. Here, the differential transmission 20, which is also simply referred to as the differential, is arranged coaxially to the output shafts 12 and 16 and thus can be rotated around the output shaft axis of rotation in relation to the housing 24. Here, the differential cage 22, in particular, can be rotated around the output shaft axis of rotation in relation to the housing 24. Compensation wheels 26 are arranged on the differential cage 22, the compensation wheels being able to be rotated around a common compensation wheel axis of rotation in relation to the differential cage 22 and also in relation to one another, for example. The compensation wheel axis of rotation here runs perpendicularly to the output shaft axis of rotation. In the first embodiment, the respective compensation wheel 26 is formed as a tooth wheel and, here, in particular as a bevel wheel. A first output wheel 28 of the differential is connected to the output shaft 12 in a rotationally fixed manner, and a second output wheel 30 of the differential transmission 20 is connected to the output shaft 16 in a rotationally fixed manner. The output wheels 28 and 30 are tooth wheels, in particular bevel wheels, wherein the respective output wheel 28, 30 meshes with the compensation wheels 26. Thus, the output wheels 28 and 30 can be rotated along with the output shafts 12 and 16 around the output shaft axis of rotation in relation to the housing 24.

Furthermore, the drive device 10 has three axial flux machines 32a-c arranged coaxially to one another and coaxially to the output shafts 12 and 16 and coaxially to the differential transmission 20. Here, the axial flux machine 32a is referred to as the first axial flux machine, the axial flux machine 32b as the second axial flux machine and the axial flux machine 32c as the third axial flux machine. It can be seen that the third axial flux machine 32c is arranged between the axial flux machines 32a and 32b in the axial direction of the axial flux machines 32a-c. The respective axial flux machine 32a-c has a respective stator 34a-c, which is connected to the housing 24 in a rotationally fixed manner. Furthermore, the respective axial flux machine 32a-c respectively has two rotors 36, 38 or 40. Here, the stator 34a is arranged between the rotors 36 of the axial flux machine 32a in the axial direction of the axial flux machine 32a. Correspondingly, the rotor stator 34b of the axial flux machine 32b is arranged between the rotors 38 of the axial flux machine 32b in the axial direction of the axial flux machine 32b. Accordingly, the stator 34c of the axial flux machine 32c is arranged between the rotors 40 of the axial flux machine 32c in the axial direction of the axial flux machine 32c.

The rotors 40 are connected to the differential cage 22 in a rotationally fixed manner, such that the differential transmission 20 can be driven by the rotors 40. As a result, the output shafts 12 and 16 can be driven by the rotors 40 and thus by the axial flux machine 32c via the differential transmission 20. By driving the output shafts 12 and 16, the vehicle wheels 14 and 18 are driven. The output shaft 12 can be driven by the rotors 36 and thus by the axial flux machine 32a by bypassing the differential transmission 20, and the output shaft 16 can be driven by the rotors 38 and thus by the axial flux machine 32b by bypassing the differential transmission 20. Here, the drive device 10 has a first transfer element 42 allocated to the output shaft 12 and the rotors 36 and a second transfer element 44 allocated to the output shaft 16 and rotors 38. The output shaft 12 can be driven via the transfer element 42 by the rotors 36 by bypassing the differential, and the output shaft 16 can be driven via the transfer element 44 by the rotors 38 by bypassing the differential transmission 20. For example, the transfer element 42, 44 is formed as a freewheel. Furthermore, it is conceivable that the respective transfer element 42, 44 is formed as a switching element, in particular that can be actuated, which can be as a frictionally engaged switching element, such as a frictional coupling, for example, in particular a lamella coupling, or even a positive-locking switching element, such as a claw coupling, for example. A respective bearing of the respective output shaft 12, 16 is labelled in FIG. 1 with 46 or 48.

Moreover, it can be seen from FIG. 1 that a respective planetary gearset 50, 52 is allocated to the respective output shaft 12, 16. The respective planetary gearset 50, 52 has a respective sun gear 54, a respective planetary carrier 56 and a respective gear ring 58. For example, the gear ring 58 is connected to the housing 24 in a rotationally fixed manner. Furthermore, the respective planetary gearset 50, 52 has respective planetary wheels 60, which are mounted rotatably on the respective planetary carrier 56 of the respective planetary gearset 50, 52. The respective sun gear 54 is connected to the respective output shaft 12, 16 in a rotationally fixed manner. Moreover, the respective vehicle wheel 14, 18 is connected to the respective planetary carrier 56 in a manner transferring torsional moment. The axial flow machine 32c arranged between the axial flow machines 32a and 32b is a central electric engine, which is also referred to as a main motor or efficiency motor and is bound to the differential. For example, the axial flux machines 32a and 32b are so-called boost motors. The output shafts 12 and 16 formed as differential shafts lead out of the differential transmission 20 to transmissions which are presently formed as planetary gearsets 50 and 52. It can be seen that the output shafts 12 and 16 penetrate the rotors 36 and 38 or respective rotor shafts of the rotors 36 and 38 and respective hub regions of the axial flux machines 32a and 32b. The respective boost motor 32a or 32b provided per side can be coupled or is coupled to the respective differential shaft, in each case via a transfer element 42, 44 formed as a freewheel or a switching element. A respective freewheel can be integrated in the respective hub region of the respective boost motor 32a, b. The freewheels are, for example, either in the hub bore, as is depicted, or engage outwardly on the hub on a shaft section. These freewheels have, for example, a centrifugal-activated clamp installation. A hydrodynamic clamp removal is also conceivable. With zero rotational speed or low absolute rotational speed of the respective boost motor, which is also referred to as the boost electric engine, the freewheel clamps do not abut on the shaft or the hub bore. The reduces the friction and the attrition of the clamping bodies. Above a certain speed, the clamping bodies are in contact and can develop their locking effect. The locking effect occurs as soon as the rotational speed of the respective boost motor reaches or exceeds the rotational speed of the differential shafts. Only when both sides with the respective freewheel are in the locked state can a torsional moment of the boost motors distributed evenly on both sides be transferred. The locking of the freewheels can also selectively take place if a torsional moment engagement is wanted on only one side. Such a freewheel would be conceivable as a transfer element 42 or 44. Alternatively to freewheels, in each case a switchable, i.e., actuatable, switching element, for example in the form of a frictional coupling or a claw coupling, can be used as the transfer elements 42, 44. The boost motors 32a, b only generate the respective torsional moment in one direction and, for example, when driving forward, if only freewheels are used as transfer elements 42, 44. If switching elements are used as transfer elements 42, 44, the respective boost motor 32a, b can also be operated in reverse. When using freewheels as the transfer elements 42, 44, the following can be provided, in particular: the two axial flux machines 32a and 32b formed as boost motors, for example, can generate propulsion moments independently of one another, in particular when driving forwards. With switched-on boost motors 32a, b, the torsional moment distribution between the two wheels 14, 18 is regulated via these two boost motors 32a, b. When using switching elements the following can apply: the two boost motors 32a, b can generate propulsion moments or braking moments independently of each other, in particular when driving forwards or backwards. With switched-on boost motors 32a, b, the torsional moment distribution between the two wheels 14, 18 is regulated via these two boost motors 32a, b. In general, it is as follows that, depending on a radial dimensioning of the rotor and the rotor design of an axial flux machine rotor, rotational speed limits emerge, smaller rotor dimensions enable higher rotational speeds. The boost motors 32a, b are thus advantageously decoupled above a certain speed. The highest speed corresponding to the entire installed electric engine performance of the three axial flux machine 32a-c on this axis would, in the event of a non-decoupling, not be able to be achieved, and the front axis of the vehicle would have to optionally provide the necessary power for the highest speed. The object of the present invention is to develop an efficient electrical drive system for moderate driving requirements, which is not over-dimensioned for these requirements. An efficiency-optimized electric engines 32c can be used, which generally also has a lower performance and a lower maximum torsional moment. The boost motors 32a, b are only still used in the comparatively rare cases of a high performance requirement or a moment engagement on the respective wheel 14, 18. The losses, which would emerge as a result of the electric drag moment of a boost motor 32a, b formed, in each case, as a permanently energized electric engine, and the bearing losses, which would emerge in the bearings of the respective rotor, do not apply. In principle, by using axial flux machines, very high performance densities and torsional moment densities can be achieved. When using centrifugal-activated freewheels as transfer elements 42, 44, the output shafts should already be rotated or the vehicle should have a minimum speed or be in the acceleration process, since the centrifugal-activated clamps only make contact above a certain rotational speed and can only then lock. With an acceleration from a standstill or from a low speed, no noticeable switching of the boost motors 32a, b emerge. When using switching elements as transfer elements 42, 44 and conventional freewheels with constantly abutting clamping bodies, these limitations do not exist.

Figure 2:
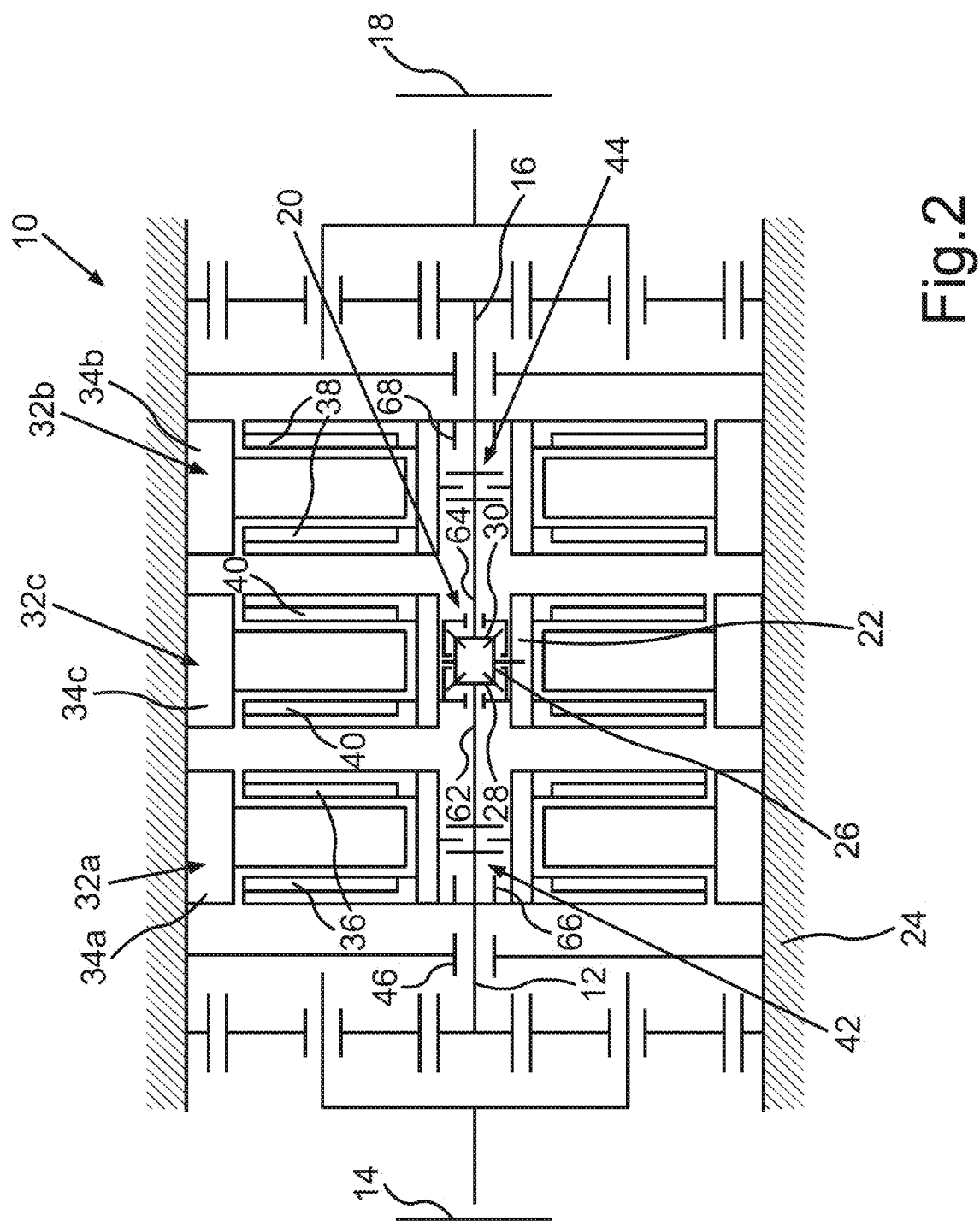
FIG. 2 a schematic depiction of a second embodiment of the drive device.

In a schematic depiction, FIG. 2 shows a second embodiment of the drive device 10. Here, the differential transmission 20 has differential shafts 62 and 64 provided, in particular, in addition to the output shafts 12 and 16, the differential shafts being arranged coaxially to one another and coaxially to the output shafts 12 and 16. Here, the output wheel 28 is connected to the differential shaft 62 in a rotationally fixed manner and the output wheel 30 is connected to the differential shaft 64 in a rotationally fixed manner. The rotors 36 and, via these, the output shaft 12 can be driven via the transfer element 42 by the differential shaft 62 and thus by the axial flux machine 32c, such that the axial flux machine 32c can drive the rotors 36 via the differential transmission 20 and the output shaft 12 via these. Via the transfer element 44, the differential shaft 64 can drive the rotors 38 and, via these, the output shaft 16, such that the axial flux machine 32c can drive the rotors 38 via the differential transmission 20 and, via these, the output shaft 16. Bearings for the differential shafts 62 and 64 are labelled with 66 and 68. The respective transfer element 42, 44 can be, for example, a freewheel or an in particular actuatable switching element, such as a frictionally engaged switching element or a positive-locking switching element, for example. Here, for example, the axial flux machines 32a and 32b are formed as efficiency motors or efficiency engines, wherein the axial flux machine 32c, in particular, is formed as a boost motor, i.e., as a boost engine. In particular, the axial flux machines 32a and 32b are electric engines with relatively low power and torsional moment, wherein the axial flux machines 32a and 32b are permanently bound to the vehicle wheels 14 and 18. The boost motor 32c is switched, for example when driving forwards, via the respective transfer element 42, 44 via the respective differential shaft 62, 64 onto the output. The respective transfer element 42, 44 is, for example, in each case a centrifugal-activated freewheel, in which, as a result of the clamp removal, no abutment of the clamping bodies is present when the boost motor 32c is inactive, and thus no additional drag losses and attrition are generated on the freewheel. Optionally, the axial flux machine 32c can be formed as a performance engine, in particular with maximum performance requirements. Wheel-individual drive torsional moment and braking torsional moment of the two efficiency engines 32a, b immediately make contact. The performance engine 32c has low switching times, since no active switching element is actuated and no synchronization of a switching element is required when the transfer elements 42 and 44 are advantageously formed as freewheels. In the event of a one-sided slip, a high torsional moment can also advantageously be portrayed on the opposite, non-slipping wheel, in particular a maximum torsional moment of the respective efficiency engine 32a, b in addition to a half available torsional moment of the performance engine 32c, wherein the respective efficiency engine 32a, b of a slipping side is additionally supported or braked as needed. Torsional moment requirements, performance requirements and highest speed requirements can thus advantageously be depicted with one gear with the embodiment of the invention from FIG. 2. The ability of the boost motor to decouple to the benefit of the highest speed is thus advantageously possible with the embodiment of the invention from FIG. 2 as well as with transfer elements 42, 44 designed as the freewheel, if the maximum rotational speed of the efficiency engine is higher than the maximum rotational speed of the boost motor. In this operating situation, the highest speed is only driven with the two efficiency engines, since the boost motor remains decoupled. In particular on a rear axis, particularly high performance can thus be achieved.

Furthermore, it is conceivable that the axial flux machine 32c is formed as an efficiency engine with relatively low performance and torsional moment and, in particular as in the first embodiment of the invention in FIG. 1, is bound permanently to the vehicle wheels 14 and 18 via the differential. Here, the axial flux machines 32a and 32b, for example, are formed as boost motors, which can each be switched on or off when driving forwards via the respective transfer element 42, 44, which is formed, in particular, as a centrifugal force freewheel, since no abutment of the clamping bodies acts when the boost motors 32a, b are inactive and thus no additional slipping losses and attrition on the freewheel. Wheel-individual drive torsional moment of the two boost motors 32a and 32b quickly make contact. Wheel-individual braking torsional moment cannot be directly generated when using freewheels as the transfer elements 42, 44 with the two boost motors 32a, b), however this is possible indirectly. The central axial flux machine 32c provides, for example, the target braking moment. The boost motor 32a or b of the wheel side, which still requires drive moment, adds the required additional torsional moment, in order to obtain the required torsional moment at the wheel. The boost motors 32a, b have low switching times, since no active switching element is actuated and no synchronization of a switching element is required. Torsional moment, performance and highest speed requirements can thus advantageously also be depicted with one gear with this design of the embodiment of the invention. An ability to switch off the boost motors to the benefit of the highest speed is possible.

LIST OF REFERENCE CHARACTERS

10 Drive device
12 Output shaft
14 Vehicle wheel
16 Output shaft
18 Vehicle wheel
20 Differential transmission
22 Differential cage
24 Housing
26 Compensation wheel
28 Output wheel
30 Output wheel
32a-c Axial flux machine
34a-c Stator
36 Rotor
38 Rotor
40 Rotor
42 Transfer element
44 Transfer element
46 Bearing
48 Bearing
50 Planetary gearset
52 Planetary gearset
54 Sun gear
56 Planetary carrier
58 Gear ring
60 Planetary wheel
62 Differential shaft
64 Differential shaft
66 Bearing
68 Bearing

The invention claimed is:

1. A drive device (10) for a car, comprising:
a first output shaft (12) via which a first vehicle wheel (14) of a vehicle axis of the car is drivable;
a second output shaft (16) disposed coaxially to the first output shaft (12) via which a second vehicle wheel (18) of the vehicle axis of the car is drivable;
a differential transmission (20) via which the first output shaft (12) and the second output shaft (16) are drivable;
three axial flux machines (32a-c) disposed coaxially to one another and coaxially to the first output shaft (12) and the second output shaft (16), wherein the three axial flux machines (32a-c) are comprised by:
a first axial flux machine (32a) via which the first output shaft (12) is drivable by bypassing the differential transmission (20);
a second axial flux machine (32b) via which the second output shaft (16) is drivable by bypassing the differential transmission (20); and
a third axial flux machine (32c) disposed between the first axial flux machine (32a) and the second axial flux machine (32b) in an axial direction of the three axial flux machines (32a-c) via which the first output shaft (12) and the second output shaft (16) are drivable via the differential transmission (20);
a first switching element (42) formed as a first freewheel via which the first output shaft (12) is drivable by the first axial flux machine (32a) by bypassing the differential transmission (20); and
a second switching element (44) formed as a second freewheel (44) via which the second output shaft (16) is drivable by the second axial flux machine (32b) by bypassing the differential transmission (20).

2. A drive device (10) for a car, comprising:
a first output shaft (12) via which a first vehicle wheel (14) of a vehicle axis of the car is drivable;
a second output shaft (16) disposed coaxially to the first output shaft (12) via which a second vehicle wheel (18) of the vehicle axis of the car is drivable;
a differential transmission (20) via which the first output shaft (12) and the second output shaft (16) are drivable;
three axial flux machines (32a-c) disposed coaxially to one another and coaxially to the first output shaft (12) and the second output shaft (16), wherein the three axial flux machines (32a-c) are comprised by:
a first axial flux machine (32a) via which the first output shaft (12) is drivable by bypassing the differential transmission (20);
a second axial flux machine (32b) via which the second output shaft (16) is drivable by bypassing the differential transmission (20); and
a third axial flux machine (32c) disposed between the first axial flux machine (32a) and the second axial flux machine (32b) in an axial direction of the three axial flux machines (32a-c) via which the first output shaft (12) and the second output shaft (16) are drivable via the differential transmission (20);
a first switching element (42) formed as a first frictionally engaged or positive-locking switching element via which the first output shaft (12) is drivable by the first axial flux machine (32a) by bypassing the differential transmission (20); and
a second switching element (44) formed as a second frictionally engaged or positive-locking switching element via which the second output shaft (16) is drivable by the second axial flux machine (32b) by bypassing the differential transmission (20).

3. A drive device (10) for a car, comprising:
a first output shaft (12) via which a first vehicle wheel (14) of a vehicle axis of the car is drivable;
a second output shaft (16) disposed coaxially to the first output shaft (12) via which a second vehicle wheel (18) of the vehicle axis of the car is drivable;
a differential transmission (20) via which the first output shaft (12) and the second output shaft (16) are drivable;
three axial flux machines (32a-c) disposed coaxially to one another and coaxially to the first output shaft (12)

and the second output shaft (16), wherein the three axial flux machines (32a-c) are comprised by:
- a first axial flux machine (32a) via which the first output shaft (12) is drivable by bypassing the differential transmission (20);
- a second axial flux machine (32b) via which the second output shaft (16) is drivable by bypassing the differential transmission (20); and
- a third axial flux machine (32c) disposed between the first axial flux machine (32a) and the second axial flux machine (32b) in an axial direction of the three axial flux machines (32a-c) via which the first output shaft (12) and the second output shaft (16) are drivable via the differential transmission (20);

a first switching element (42) formed as a first freewheel via which the first output shaft (12) is drivable by the third axial flux machine (32c) by including the differential transmission (20); and a second switching element (44) formed as a second freewheel via which the second output shaft (16) is drivable by the third axial flux machine (32c) by including the differential transmission (20).

4. A drive device (10) for a car, comprising:
- a first output shaft (12) via which a first vehicle wheel (14) of a vehicle axis of the car is drivable;
- a second output shaft (16) disposed coaxially to the first output shaft (12) via which a second vehicle wheel (18) of the vehicle axis of the car is drivable;
- a differential transmission (20) via which the first output shaft (12) and the second output shaft (16) are drivable;
- three axial flux machines (32a-c) disposed coaxially to one another and coaxially to the first output shaft (12) and the second output shaft (16), wherein the three axial flux machines (32a-c) are comprised by:
  - a first axial flux machine (32a) via which the first output shaft (12) is drivable by bypassing the differential transmission (20);
  - a second axial flux machine (32b) via which the second output shaft (16) is drivable by bypassing the differential transmission (20); and
  - a third axial flux machine (32c) disposed between the first axial flux machine (32a) and the second axial flux machine (32b) in an axial direction of the three axial flux machines (32a-c) via which the first output shaft (12) and the second output shaft (16) are drivable via the differential transmission (20);
- a first switching element (42) formed as a first frictionally engaged or positive-locking switching element via which the first output shaft (12) is drivable by the third axial flux machine (32c) by including the differential transmission (20); and
- a second switching element (44) formed as a second frictionally engaged or positive-locking switching element via which the second output shaft (16) is drivable by the third axial flux machine (32c) by including the differential transmission (20).

* * * * *